(12) United States Patent
Cook et al.

(10) Patent No.: US 11,025,510 B2
(45) Date of Patent: *Jun. 1, 2021

(54) OPTIMIZING STREAMING GRAPH TOPOLOGY BASED ON SERVICE LEVEL AGREEMENT

(71) Applicant: International Business Machines Corporation, Armonk, NY (US)

(72) Inventors: Alexander Cook, London (GB); David M. Koster, Reston, VA (US); Jason A. Nikolai, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,973

(22) Filed: Jan. 20, 2020

(65) Prior Publication Data

US 2020/0153709 A1    May 14, 2020

Related U.S. Application Data

(63) Continuation of application No. 15/463,289, filed on Mar. 20, 2017, now Pat. No. 10,601,681.

(51) Int. Cl.
*H04L 12/24* (2006.01)
*H04L 29/06* (2006.01)
*H04L 12/26* (2006.01)

(52) U.S. Cl.
CPC ........ *H04L 41/5035* (2013.01); *H04L 41/509* (2013.01); *H04L 41/5025* (2013.01); *H04L 43/08* (2013.01); *H04L 65/602* (2013.01)

(58) Field of Classification Search
CPC ... H04L 41/509; H04L 43/08; H04L 41/5035; H04L 41/5025; H04L 65/602
(Continued)

(56) References Cited

U.S. PATENT DOCUMENTS

| 80,606,142 | 12/2009 | Goldstein et al. |
| 94,560,142 | 6/2016 | Luo et al. |

(Continued)

OTHER PUBLICATIONS

IBM: List of IBM Patents or Patent Applications Treated as Related, 2 pg.

(Continued)

*Primary Examiner* — Frantz B Jean
(74) *Attorney, Agent, or Firm* — Cuenot, Forsythe & Kim, LLC

(57) ABSTRACT

System resource usage by a streaming application processing workloads can be monitored, the streaming application comprising at least one parallelizable operator, at least a first instance of the parallelizable operator being initialized to execute. Based on the monitoring, at least one performance metric for the streaming application in processing the workloads can be determined. Based on the at least one performance metric, whether hosting of the streaming application is, or is near to, violating at least one criteria can be determined. If so, at least one additional instance of at least one parallelizable operator of the streaming application that is currently executing can be initialized. Responsive to initializing the at least one additional instance of at least one of the parallelizable operators, a portion of the workloads can be directed to the at least one additional instance of at least one of the parallelizable operators.

20 Claims, 10 Drawing Sheets

(58) Field of Classification Search
USPC .......................................................... 709/219
See application file for complete search history.

(56) References Cited

U.S. PATENT DOCUMENTS

| | | |
|---|---|---|
| 10,601,681 B2 | 3/2020 | Cook et al. |
| 2002/0152305 A1* | 10/2002 | Jackson ................ H04L 41/509 709/224 |
| 2003/0046396 A1* | 3/2003 | Richter ................... G06F 9/505 709/226 |
| 2004/0148423 A1 | 7/2004 | Key et al. |
| 2014/0089459 A1 | 3/2014 | Werr |
| 2015/0207749 A1* | 7/2015 | Cao ..................... G06F 11/3072 709/226 |
| 2016/0179560 A1* | 6/2016 | Ganguli ............. G06F 11/3442 718/1 |

OTHER PUBLICATIONS

Cook, A. et al., "Optimizing Streaming Graph Topology Based on Service Level Agreement", U.S. Appl. No. 16/746,973, filed Jan. 20, 2020, 47 pages.

Cook, A. et al., "Optimizing Streaming Graph Topology Based on Service Level Agreement", U.S. Appl. No. 15/463,289, filed Mar. 20, 2017, 47 pages.

* cited by examiner

1400

```
Monitor system resource usage by a streaming application processing workloads
and, based on the monitoring, determining at least one performance metric for
the streaming application in processing the workloads
1402
```

```
Determine, based on the at least one performance metric, whether hosting of the
streaming application is, or is near to, violating at least one criteria specified by a
service level agreement for the streaming application
1404
```

```
Responsive to determining that hosting of the streaming application is, or is near
to, violating the at least one criteria specified by the service level agreement,
initialize, using a processor, at least one additional instance of at least one
parallelizable operator of the streaming application that is currently executing
1406
```

```
Responsive to initializing the at least one additional instance of at least one of the
parallelizable operators, direct a portion of the workloads to the at least one
additional instance of at least one of the parallelizable operators
1408
```

FIG. 14

OPTIMIZING STREAMING GRAPH TOPOLOGY BASED ON SERVICE LEVEL AGREEMENT

BACKGROUND

The present invention relates to streaming applications, and more specifically, to hosting of streaming applications.

Application streaming is a form of on-demand software distribution. In these scenarios, portions of an application's program code and files essential to the application may be initially installed on the client device, while other portions of program code and files not essential to the application may not be initially installed. As an end user performs actions in the application, non-essential portions of program code and files can be delivered to the client device over a network as they are required, and cached locally on the client device.

The concept of application streaming offers several major advantages over traditional software distribution. Given the complexity of modern applications, many functions are never, or are seldom, used. Streaming such functions of the application on demand is more efficient in terms of server, client and network usage. Streaming also allows for applications to be cached on a client device and still run in a traditional manner. Further, updates can also be deployed automatically to the cached application files.

SUMMARY

A method includes monitoring system resource usage by a streaming application processing workloads, the streaming application including at least one parallelizable operator, at least a first instance of the parallelizable operator being initialized to execute. The method also can include, based on the monitoring the system resource usage by the streaming application processing the workloads, determining at least one performance metric for the streaming application in processing the workloads. The method also can include determining, based on the at least one performance metric, whether hosting of the streaming application is, or is near to, violating at least one criteria. The method also can include, responsive to determining that hosting of the streaming application is, or is near to, violating the at least one criteria specified by the service level agreement, initializing, using a processor, at least one additional instance of the at least one parallelizable operator of the streaming application. The method also can include, responsive to initializing the at least one additional instance of at least one of the parallelizable operators, directing a portion of the workloads to the at least one additional instance of at least one of the parallelizable operators.

A system includes a processor programmed to initiate executable operations. The executable operations include monitoring system resource usage by a streaming application processing workloads, the streaming application including at least one parallelizable operator, at least a first instance of the parallelizable operator being initialized to execute. The executable operations also can include, based on the monitoring the system resource usage by the streaming application processing the workloads, determining at least one performance metric for the streaming application in processing the workloads. The executable operations also can include determining, based on the at least one performance metric, whether hosting of the streaming application is, or is near to, violating at least one criteria. The executable operations also can include, responsive to determining that hosting of the streaming application is, or is near to, violating the at least one criteria specified by the service level agreement, initializing at least one additional instance of the at least one parallelizable operator of the streaming application. The executable operations also can include, responsive to initializing the at least one additional instance of at least one of the parallelizable operators, directing a portion of the workloads to the at least one additional instance of at least one of the parallelizable operators.

A computer program product includes a computer readable storage medium having program code stored thereon, the program code executable by a data processing system to initiate operations. The operations include monitoring system resource usage by a streaming application processing workloads, the streaming application including at least one parallelizable operator, at least a first instance of the parallelizable operator being initialized to execute. The operations also can include, based on the monitoring the system resource usage by the streaming application processing the workloads, determining at least one performance metric for the streaming application in processing the workloads. The operations also can include determining, based on the at least one performance metric, whether hosting of the streaming application is, or is near to, violating at least one criteria. The operations also can include, responsive to determining that hosting of the streaming application is, or is near to, violating the at least one criteria specified by the service level agreement, initializing at least one additional instance of the at least one parallelizable operator of the streaming application. The operations also can include, responsive to initializing the at least one additional instance of at least one of the parallelizable operators, directing a portion of the workloads to the at least one additional instance of at least one of the parallelizable operators.

BRIEF DESCRIPTION OF THE DRAWINGS

FIG. 14 is a flow chart illustrating an example of a method of performing resource allocation for a streaming application.

DETAILED DESCRIPTION

Figure 1:
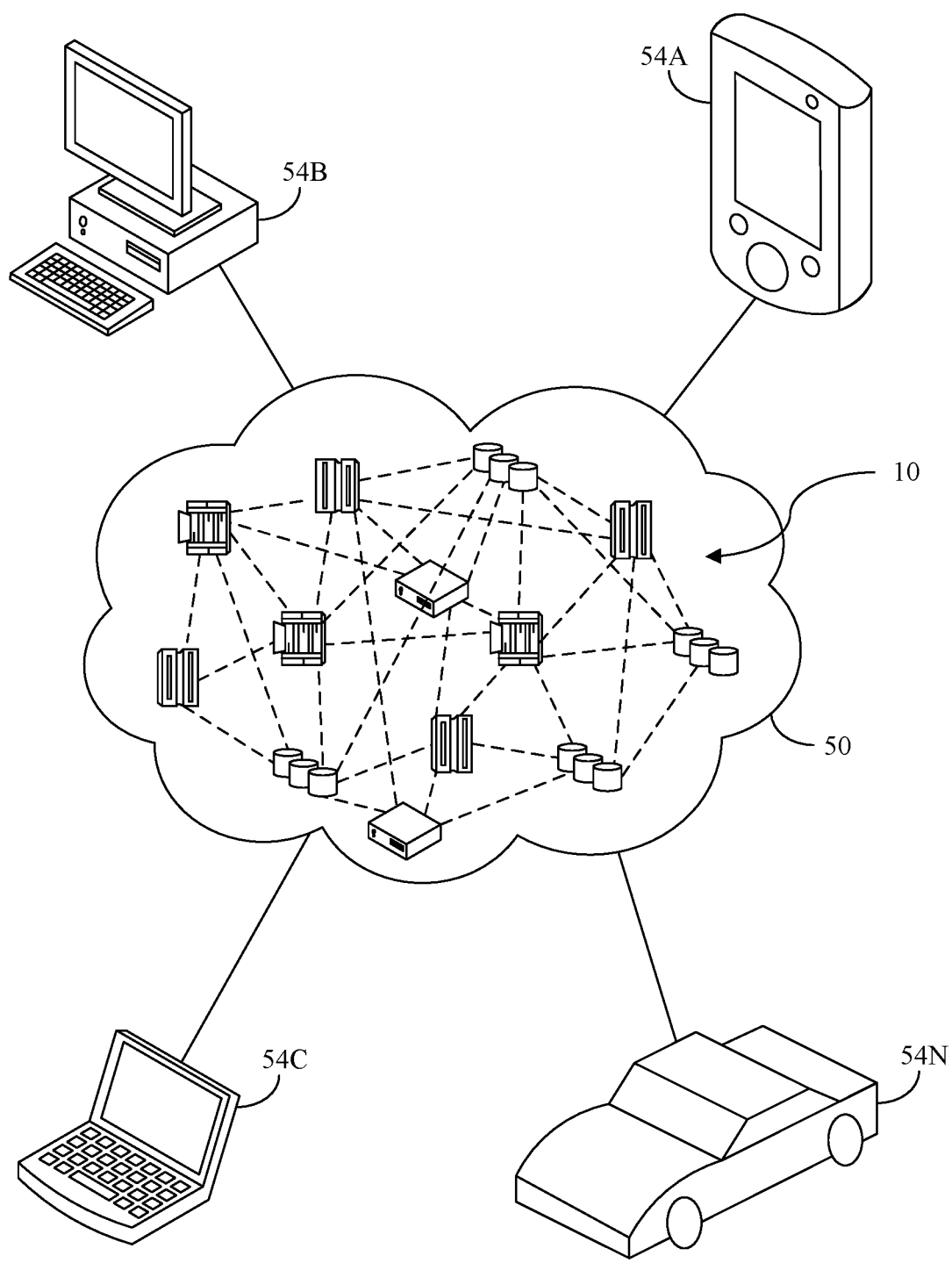
FIG. 1 depicts a cloud computing environment according to an embodiment of the present invention.

The present invention relates to streaming applications, and more specifically, to hosting of streaming applications. In accordance with the inventive arrangements disclosed herein, a streaming application can be analyzed to identify parallelizable operators and non-parallelizable operators contained within the streaming application. The streaming application can be compiled and deployed. While the streaming application is live, system resource usage by the streaming application can be monitored, and performance metrics for the streaming application in processing workloads can be determined. Based on the performance metrics, a determination can be made as to whether hosting of the streaming application is, or is near to, violating at least one criteria specified by a service level agreement in place for the streaming application. If so, one or more instances of one or more of the parallelizable operators can be initialized, and a portion of the workloads can be directed to the additional instance(s). If the streaming application is underutilizing system resources, execution of one or more instances of the one or more operators can be terminated. Accordingly, the present arrangements facilitate dynamic system resource allocation to the streaming application to ensure that hosting of the streaming application satisfies the criteria specified by the service level agreement, while not over allocating system resources beyond those which are necessary to satisfy the criteria. This can greatly improve system resource utilization, while still meeting customer expectations.

Several definitions that apply throughout this document now will be presented.

As defined herein, the term "streaming application" means an application for which a at least a first portion of the application's program code deemed to be essential for execution of the application is stored in bulk storage of a client device, but at least a second portion of the application's program code is not initially stored by the client device and, instead, is automatically streamed to the client device when requested by the application during execution of the application. Rather than being stored to the bulk storage, the second portion of the application's program code can be stored in cache memory and/or local memory.

As defined herein, the term "operator" means a computer programing construct that designates an operation to be performed.

As defined herein, the term "parallelizable operator" means an operator for which a plurality of instances of the operator may be simultaneously executed without causing one or more errors.

As defined herein, the term "non-parallelizable operator" means an operator for which executing a plurality of instances of the operator simultaneously will cause one or more errors.

As defined herein, the term "idempotent operator" means an operator that does not have one or more side effects outside of the operator itself.

As defined herein, the term "streams graph" means a directed graph where each edge in the directed graph represents a stream, and each node in the directed graph represents an invocation of an operator.

As defined herein, the term "service level agreement," referred to by the acronym "SLA," means a functional data structure comprising data representing a commitment, specified by one or more criteria, between a service provider and a customer that uses services provided by the service provider, regarding services provided by the service provider to the customer.

As defined herein, the term "metric" means at least one value indicating a measured parameter.

As defined herein, the term "performance metric" means a metric representing a level of performance at processing data.

As defined herein, the term "near" means within a threshold value. For example, if a metric is near to a first threshold value, this means that the metric is within a second threshold value of the first threshold value. The second threshold value can be a default threshold value or a value set by a system administrator.

As defined herein, the term "system process" means a software construct specifying a particular group of one or more hardware resources used to process computer program code. For example, a system process can specify one or more processors, one or more cores of a processor, or one or more threads of a processor. In another example, a system process can specify one or more regions of memory, for example one or more regions of cache memory, one or more regions of local memory, and/or one or more regions of one or more bulk storage devices. In yet another example, a "system process" can specify input/output resources used by a system. In this regard, a "system process" can specify one or more of processor resources, memory resources and/or input/output resources in a data processing system. In a further example, a system process can specify an entire data processing system.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
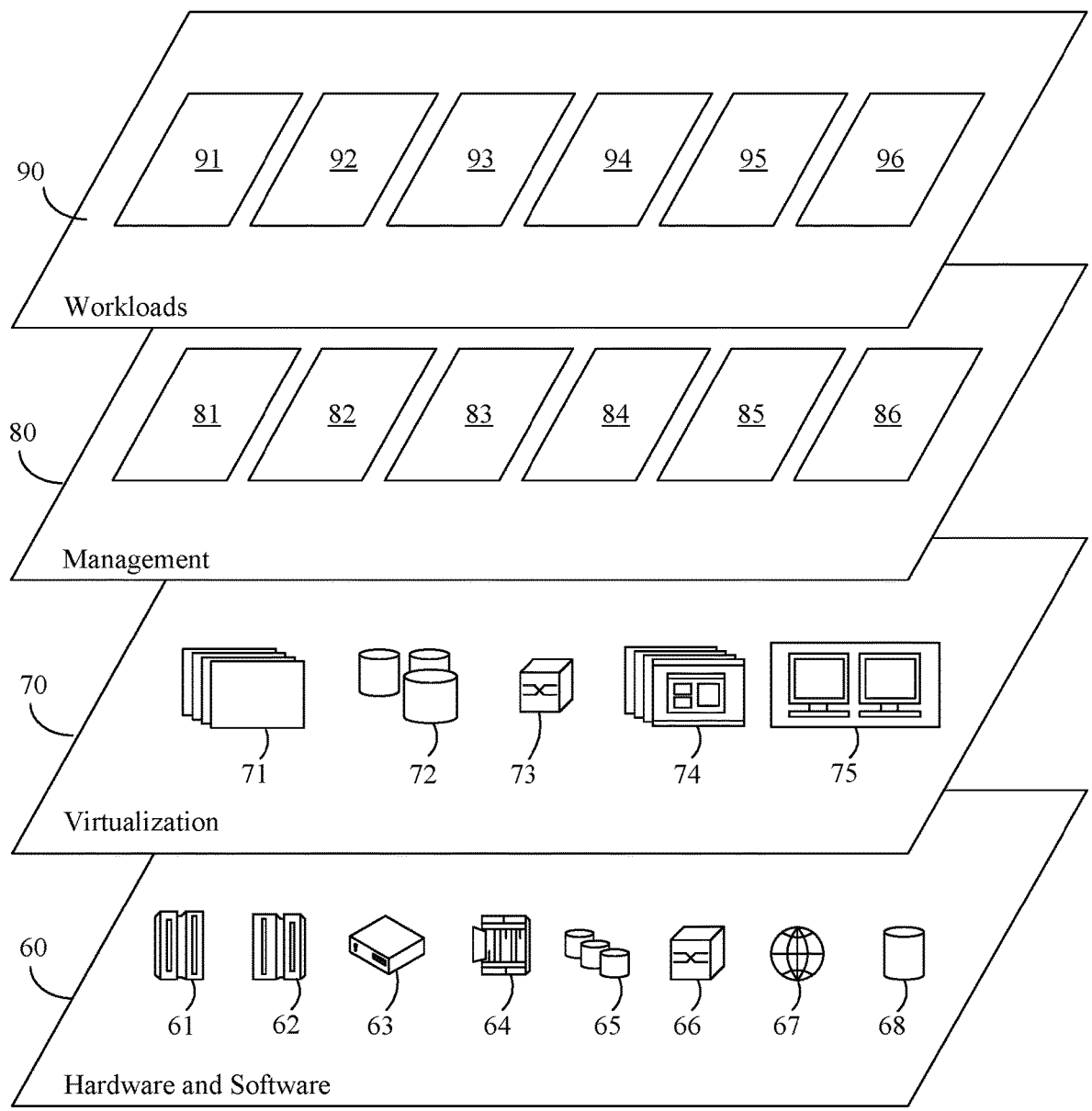
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Streams service 86 decomposes streaming applications into parallelizable and non-parallelizable operators, and enumerates any user inserted restrictions (e.g., hosts allowed, colocation, exlocation, etc.). Streams service 86 also can negotiate with resource provisioning 81 to acquire resources for streaming applications the streams service 86 determines the streaming applications will need. Streams service 86 is described herein in further detail.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delivery/processing for various other cloud based services 96. The various workloads and functions can be implemented using various streaming application operators, which are described herein in further detail.

Figure 3:
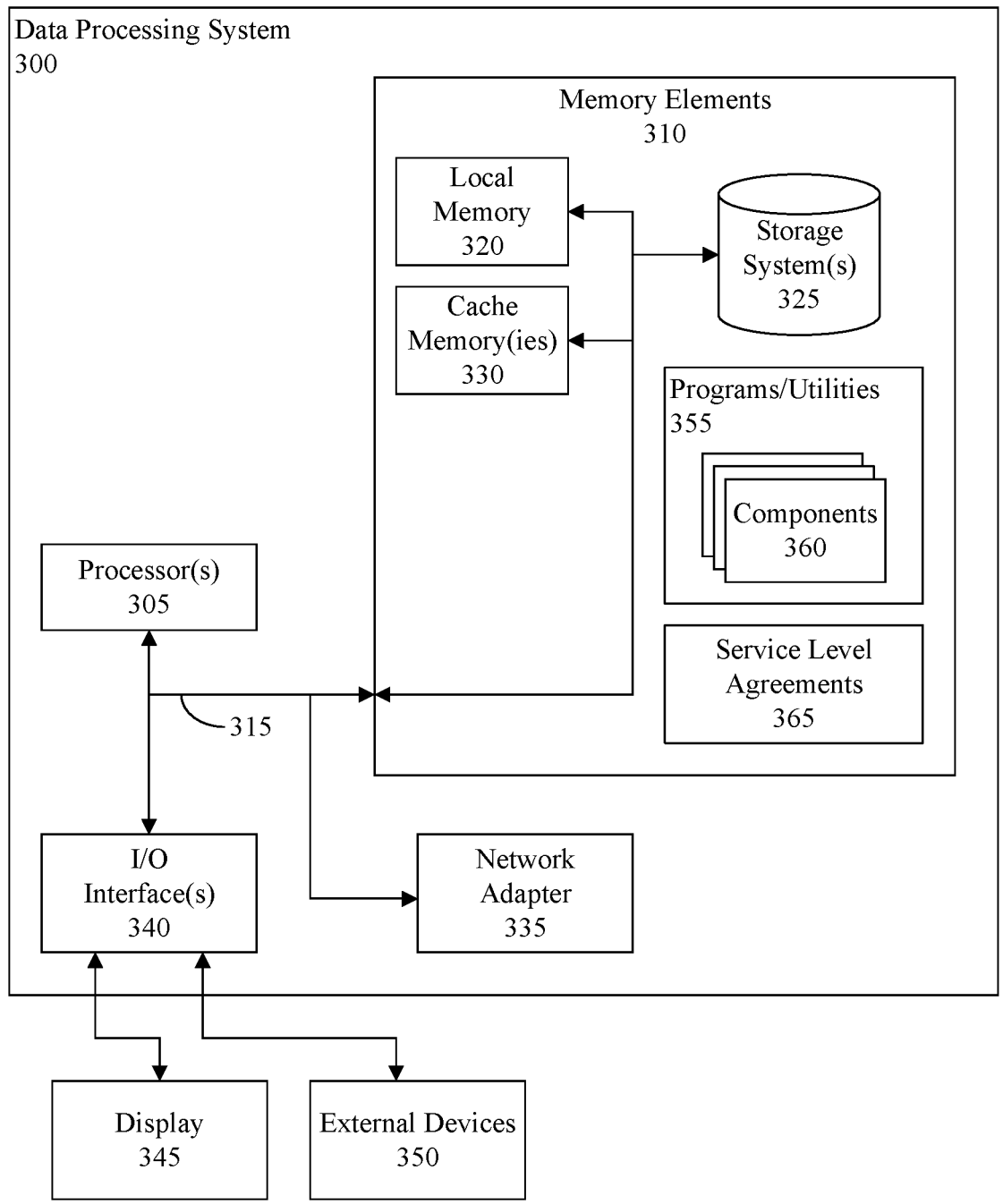
FIG. 3 depicts a block diagram illustrating example architecture for a data processing system.

FIG. 3 is a block diagram illustrating example architecture for a data processing system 300. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including at least one processor and memory that is capable of performing the functions and/or operations described within this specification. For example, the data processing system 300 can be implemented as a server or a plurality of communicatively linked servers.

The memory elements 310 can include one or more physical memory devices such as, for example, local memory 320 and one or more storage systems 325. Each storage system 325 can include one or more bulk storage devices 325 and, optionally, storage controllers. Local memory 320 refers to random access memory (RAM) or other non-persistent memory device(s) generally used during actual execution of the program code. The bulk storage device(s) can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the bulk storage device 325 during execution.

The data processing system 300 also can include one or more network adapters 335. The network adapter(s) 335 can enable the data processing system 300 to become coupled to other systems, computer systems, remote printers, and/or remote storage devices through intervening private or public networks. Modems, cable modems, transceivers, and Ethernet cards are examples of different types of network adapters 335 that can be used with the data processing system 300. The data processing system 300 also can include one or more input/output (I/O) interfaces 340, for example one or more I/O controllers. Via the I/O interfaces 340, I/O devices such as a display 345 and/or other external devices 350 can be coupled to the data processing system 300.

As pictured in FIG. 3, the memory elements 310 can store the programs/utilities 355 executed by the data processing system 300. The programs/utilities 355 can include one or more components 360, for example components 360 that implement resource provisioning 81, metering and pricing 82, user portal 83, service level management 84, SLA planning and fulfillment 85, and streams service 86 of FIG. 2. Being implemented in the form of executable program code, these components 360 can be executed by the data processing system 300 and, as such, can be considered part of the data processing system 300. Moreover, the components 360 are functional data structures that impart functionality when employed as part of the data processing system 300. In addition, the memory elements 310 also can store service level agreements (SLAs) 365, which also are functional data structures that impart functionality when employed as part of the data processing system 300. Each service level agreements 365 can specify criteria, for example, a minimum level of availability of resources provided by a service provider, a level of quality of service (QoS) provided by the resources, responsibilities of the service provider and/or customer for whom the resources are provided, pricing information, and so on. The level of QoS can include criteria specifying a maximum workload volume, a percentage of dropped workloads, a minimum latency for processing workloads, and so on. In illustration, the level of QoS can include, for each of a plurality of respective workload volumes, criteria specifying a guaranteed minimum of percentage of dropped workloads and a minimum latency for processing of the workloads.

Figure 4:
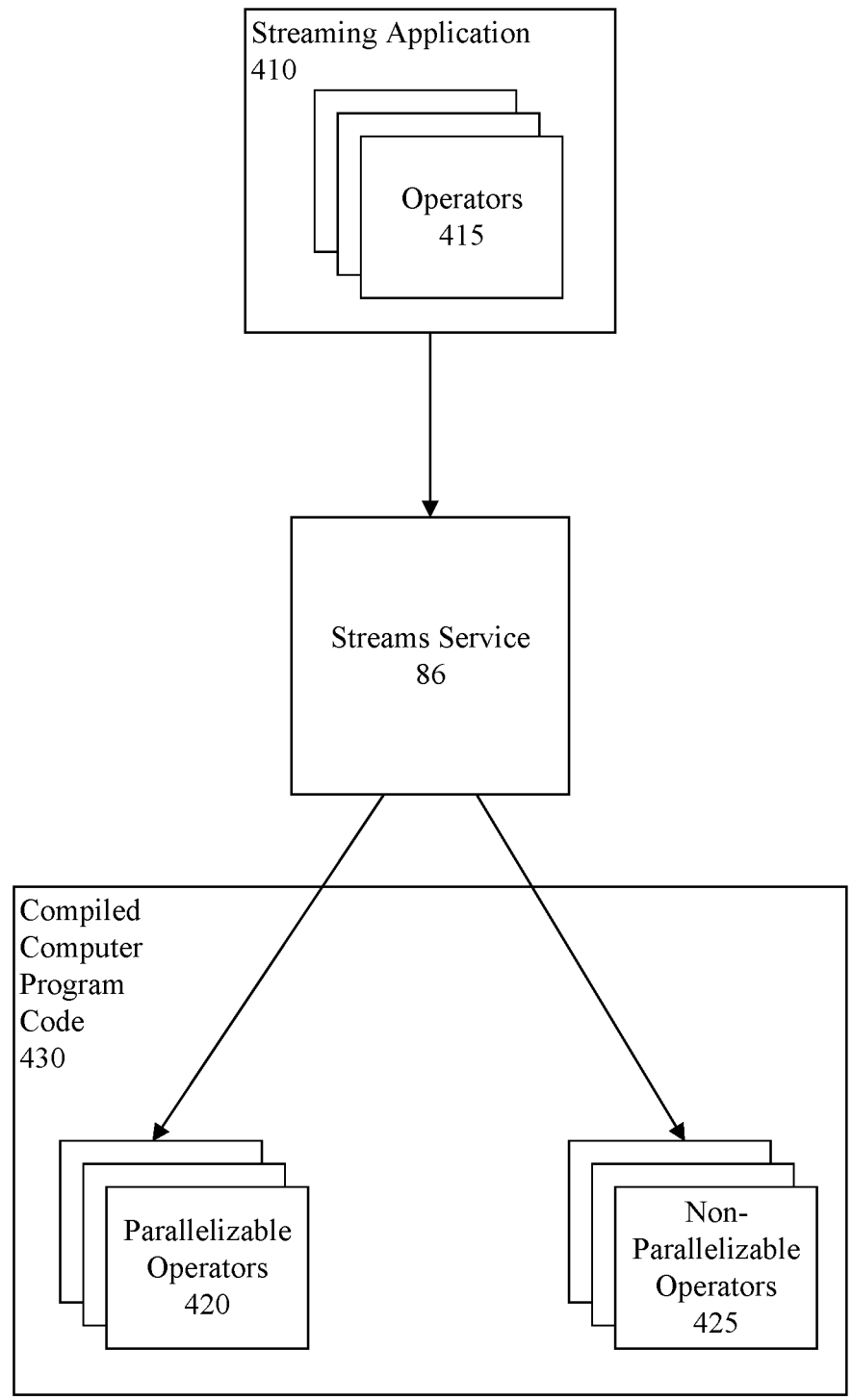
FIG. 4 depicts an example implementation of a streams service.

FIG. 4 depicts an example operation performed by a streams service 86. The streams service 86 can receive as an input a streaming application 410 comprising a plurality of streaming operators (hereinafter "operators") 415. For example, the streams service 86 can receive the streaming application from a client device or a server. The streaming application 410 can comprise one or more series of logical steps defined by the operators 415. In one non-limiting arrangement, the streaming application 410 can be generated using streams processing language (SPL), for example using IBM® Studio. IBM® Studio is a software design environment in which users can write applications using SPL, and create operators in the applications using SPL and/or other programming languages.

SPL is a distributed data flow composition language. As such, the streaming application 41 can define a streams graph, which is a directed graph where each edge in the directed graph represents a stream, and each node in the directed graph represents an invocation of an operator 415. A stream is a sequence of tuples, and each time an operator invocation receives a tuple on one of its input streams, it executes, and produces some number of tuples on its output stream(s). The output stream(s) can be communicated to another operator or to another system. Thus, using SPL, the streaming application can be defined by a streams graph, wherein tuples are received by operators, the operators perform processes on the tuples, and the operators output tuples resulting from the operations performed on the received tuples. SPL targets scalable data analytics applications and is suitable for many domains. It achieves this goal by combining a simple and flexible flow language with an extension mechanism for integrating native code as fast, flexible, and reusable operators. This combination makes it possible to express, naturally, algorithms from a variety of streaming languages that are less general and more specialized to a particular domain.

As noted, the operators 415 can be written in SPL and/or one or more other programming languages. For example, one or more operators 415 can be written in C++, Java®, Python™, R, etc. The streams service 86 can disassemble the streaming application 410, for example by parsing from the streaming application 410 the various operators 415, and analyze the operators 415. Based on such analysis, the streaming application 410 can designate each of the operators 415 to be a parallelizable operator 420 or a non-parallelizable operator 425. The analysis can include determining how the operators 415 interact with each other, what dependencies may exist between the various operators 415, what functions the various operators 415 perform, and so on.

For example, operators 415 that perform mutations of data (e.g., computations), speech-to-text, text-to-speech, sentiment analysis, etc. can be assigned to be parallelizable operators 420. Operators 415 that perform input/output operations, for example data base access operations, can be assigned to be non-parallelizable operator 425. In illustration, it may not be suitable for parallel instances of an operator 415 that writes data to a data base to be executing. If parallel instances of such an operator 415 were executing, data base access (e.g., read/write) operations performed by the parallel instances of the operator 415 may conflict with one another. Accordingly, such an operator 415 can be assigned to be a non-parallelizable operator 425.

Still, other types of operators 415 can be assigned to be non-parallelizable operators 425. For example, operators 415 in some ordered processes may not be parallelizable. In illustration, if a first operator 415 occurs in a stream before a second operator 415, and the second operator 415 occurs in the stream before a third operator 415, one or more of the first, second and third operators 415 may or may not be parallelizable depending on the nature of the ordered process. In illustration, the streaming application 410 can specify restrictions on parallelization for certain operators, for example a number of hosts allowed to host instances of the operator, colocation requirements for the operator and/or operator instances, exlocation requirements for the operator and/or operator instances, etc.

Having determined which operators 415 are parallelizable operators 420 and which operators 415 are non-parallelizable operators 425, the streams service 86 can decompose the streaming application 410 into parallelizable operators 420 and non-parallelizable operators 425 and compile the streaming application 410 to generate compiled computer program code 430, including the parallelizable operators 420 and the non-parallelizable operators 425. In this regard, the streams service 86 can include, or otherwise access, a compiler to compile the streaming application 410 into suitable computer program code optimized for parallelization of the parallelizable operators 420. Further, the compiler can rewrite the streaming application 410, duplicating operators 415 and other regions of the streaming application 410, to rewrite the streaming application 410 to parallelize the parallelizable operators given the nature of the operators 415 and constraints of the operators 415 defined in the streaming application 410. Further details of the compile operation are discussed with reference to FIG. 13.

Figure 5:
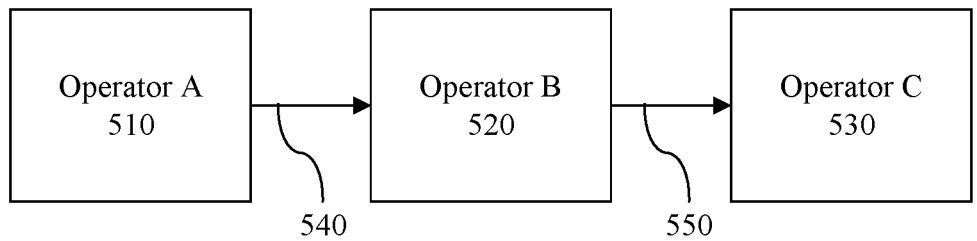
FIG. 5 depicts an example of a streams graph.

FIG. 5 depicts an example of a streams graph 500, which can be generated during development of the streaming application 410. The streams graph 500 can include a plurality of nodes representing operators defined in the streaming application 410, for example nodes 510, 520, 530. Each node 510, 520, 530 can represent invocation of a respective operator. For example, node 510 can represent an invocation of an operator A, node 520 can represent an invocation of an operator B, and node 530 can represent an invocation of an operator C. In addition, the streams graph 500 can include a plurality of edges 540, 550. For example, the edge 540 can extend between the nodes 510, 520, and the edge 550 can extend between the nodes 520, 530. The edge 540 can represent a stream of tuples flowing from node 510 to node 520, and the edge 550 can represent a stream of tuples flowing from node 520 to node 530. In illustration, the edge 540 can represent a stream of tuples output by operator A and input to operator B, and the edge 550 can represent a stream of tuples output by operator B and input to operator C.

Figure 6:
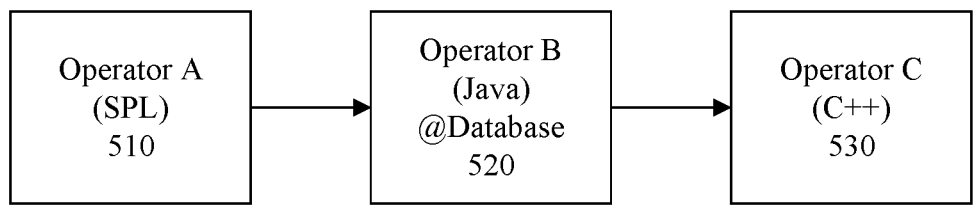
FIG. 6 depicts another example of a streams graph.

FIG. 6 depicts another example of a streams graph 600. In this example, the operators represented by nodes 510, 520, 530 of the streams graph 600 can be written using one or more different computer programming languages, respectively. For instance, operator A can be written using SPL, operator B can be written using Java®, and operator C can be written using C++. In this example, operator B can perform database access operations, for example writing data to a data base.

Figure 7:
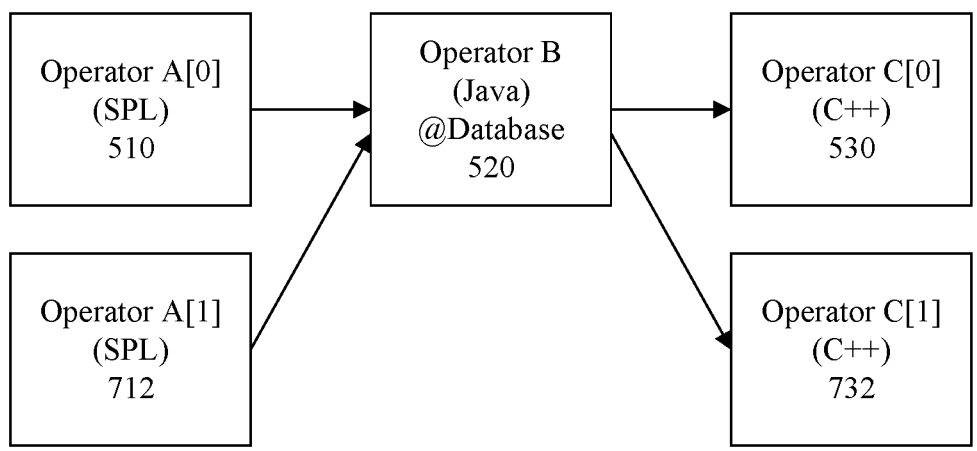
FIG. 7 depicts an example of a streams graph in which operators are parallelized.

FIG. 7 depicts an example of a streams graph 700 in which operators represented by nodes 510, 520, 530 of streams graph 600 of FIG. 6 are parallelized by the streams service 86 (FIGS. 2 and 4). The stream graph 700 can be automatically generated by the streams service 86 by processing and compiling a streaming application 410 (FIG. 4) that defines the streams graph 600 to generate the compiled computer program code 430. Responsive to receiving the streaming application 410 (e.g., the streams graph 600), the streams service 86 can analyze the operators represented by nodes 510, 520, 530, including the computer programming languages in which the respective operators are written and any tags that may be assigned to the respective operators. Based on such analysis, the streams service 86 can automatically determine which operators may be parallelized, identify such operators as being parallelizable operators, determine which operators are not parallelizable (e.g., should not be parallelized), and identify such operators as being non-parallelizable operators. In illustration, the streams service 86 can identify idempotent operators, which are those operators that do not have side effects outside of themselves. A side effect can be, for example, an impact on another operator other than streaming tuples to the other operator. For instance, an operator that adds the value of two incoming tuples and outputs the sum is idempotent. On the other hand, an operator that writes the sum to a database may not be idempotent. In this regard, having two operators, or two instances of an operator simultaneously executing, writing to a database might cause write conflicts with the database, especially if the database is managed by a different application or an outside entity.

In the present example, operator B at node 520 performs database access operations. Accordingly, the streams service 86 can determine that operator B is not idempotent, and thus should not be paralyzed. The streams service 86 can indicate that operator B is a non-parallelizable operator in any suitable manner, for example by assigning one or more tags or metadata to that operator identifying the operator as being a non-parallelizable operator. Further, the streams service 86 can indicate in the streams graph 700 that operator B is a non-parallelizable operator, for example by displaying operator B without an instance identifier (e.g., without "[0]" following the indication "Operator B").

Operators A and C at nodes 510, 530, respectively, however, do not perform data base access operations. Moreover, the streams service 86 can determine that operators A and C do not have any other side effects outside of themselves, respectively, and thus are idempotent. Accordingly, the streams service 86 can determine that operators A and C may be parallelized. The streams service 86 can indicate that operator A and operator B are parallelizable operators in any suitable manner, for example by assigning tags or metadata to those operators identifying the operators as being parallelizable operators. Further, the streams service 86 can indicate in the streams graph 700 that operators A and C are parallelizable operators, for example by displaying operators A and C with respective an instance identifiers (e.g., with "[0]" following a first instance of "Operator A," and with "[0]" following a first instance of "Operator C," etc.).

In this example, the streams service 86 can parallelize operator A into a first instance, operator A[0] at node 510, and a second instance, operator A[1] at node 712. Similarly, the streams service 86 can parallelize operator C into a first instance, operator C[0] at node 530, and a second instance, operator C[1] at node 732. Of course, the streams service 86 can parallelize the operators A and C into any number of instances, and the present arrangements are not limited in this regard. In one non-limiting arrangement, rather than initially creating the additional instances of the operators A and C, the streams service 86 (or another component of the management layer of FIG. 2) can dynamically initiate additional instances as needed, for example to maintain compliance with a SLA applicable to the streaming application, as will be described.

Parallelizing operators as described herein can allow the streaming application to be scaled to meet various workload levels. In the case that operators are dynamically parallelized by adding new operator instances when needed, the streaming application can be dynamically scaled, in real time, in accordance with changing workload demands. In illustration, as the workload of the streaming application increases, additional operator instances can be added for the streaming application. As the workload of the streaming application decreases, operator instances can be removed from the streaming application, thus conserving various system resources used for hosting of the operator instances. Notwithstanding, the streams service 86 can initially deploy the streaming application in accordance with the streams graph 700. Thus, a plurality of instances of operators A and B can be initialized upon deployment of the streaming application to processing resources assigned to system processes. An example of a system process is a Linux® processing element, but the present arrangements are not limited in this regard. For example, in response to analyzing the streams graph 600, the streams service 86 can analyze one or more SLAs applicable to the streaming application and determine that a plurality of instances of certain parallelizable operators are anticipated to be required to meet the SLA(s). If so, the streams service 86 can deploy the streaming application with the plurality of instances of the certain parallelizable operators being initialized on one or more processing resources.

Figure 8:
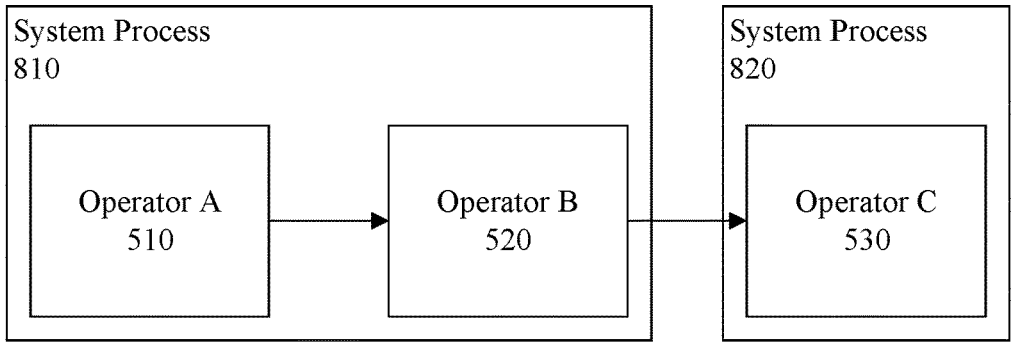
FIG. 8 depicts an example of a streams graph in which one or more operators are placed together in a system process.

FIG. 8 depicts an example of a streams graph 800 in which one or more operators are placed together in a system process by the streams service 86 during processing and compiling of the streaming application 410 that defines the streams graph 500 to generate the compiled computer program code 430. In addition to parallelizing operators, the streams service 86 can perform other optimizations on the streaming application, for example at runtime. In some cases, the additional optimizations can be performed without changing the streams graph 800 as defined by the streaming application. In illustration, the streams service 86 can group one or more operators A, B, C into a system process. By way of example, the streams service 86 can group operator A and operator B, represented by nodes 510, 520, respectively, into a system process 810, and assign operator C represented by node 530 into a different system process 820. Each system process 810, 820 can use one or more processing threads to execute operators it contains. For example, the system process 810 can use a first portion of threads (e.g., one or more threads) to execute operator A and a second portion of threads (e.g., one or more threads) to execute operator B.

Grouping operators into system processes can improve resource utilization. For example, operator A may not fully use all of the resources provided by system process 810. By analyzing operator A and the amount of resources provided by system process 810, the streams service 86 can determine whether this is the case. If so, the streams service 86 can determine whether system process 810 includes enough available resources also to host operator B. If so, the streams service 86 also can assign operator B to the system process 810.

Because operator B receives data from operator A and operator C receives data from operator B, it can be much more efficient to group operators A and B, operators B and C, or operators A, B and C into the same system process, rather than grouping operators A and C into the same system process without operator B. For example, if operators A and C were grouped into the system process 810, and operator B were assigned to system process 820, the level of communication between the operators would increase—data output from operator A to operator B would flow from system process 810 to system process 820, and data output from operator B to operator C would flow from system process 820 back to system process 810. The system processes 810, 820 may be hosted on different system resources. Thus, the increased level of communication between system processes 810 and 820 can further increase workload on network communications and input/output devices tasked with providing such communication. By grouping operators that occur in sequence into the same system process 810, the level of communication between system processes 810 and 820 can be minimized, thereby improving overall performance of the system.

Nonetheless, in some instances, it may not be desirable to group operators A, B and C into the same system process if operator B is parallelizable. For example, if additional instances of operator B are initiated due to workload demands, but the system process already is at or near capacity hosting operators A, B and C, the system process may not have enough additional capacity available to host additional instances or operator B. Operator A and/or operator B could be moved to a different system process, though, if such circumstance were to arise.

Figure 9:
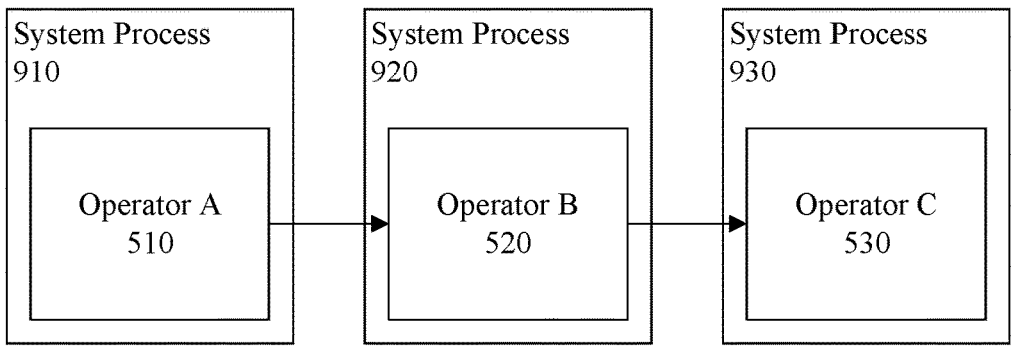
FIG. 9 depicts an example of a streams graph in which operators are placed in respective system processes.

FIG. 9 depicts an example of a streams graph 900 in which operators are placed in respective system processes during processing and compiling of the streaming application 410 that defines the streams graph 500 to generate the compiled computer program code 430. In this example, operator A represented by node 510 can be placed into a system process 910, operator B represented by node 520 can be placed into a system process 910, and operator C represented by node 530 can be placed into a system process 910.

Figure 10:
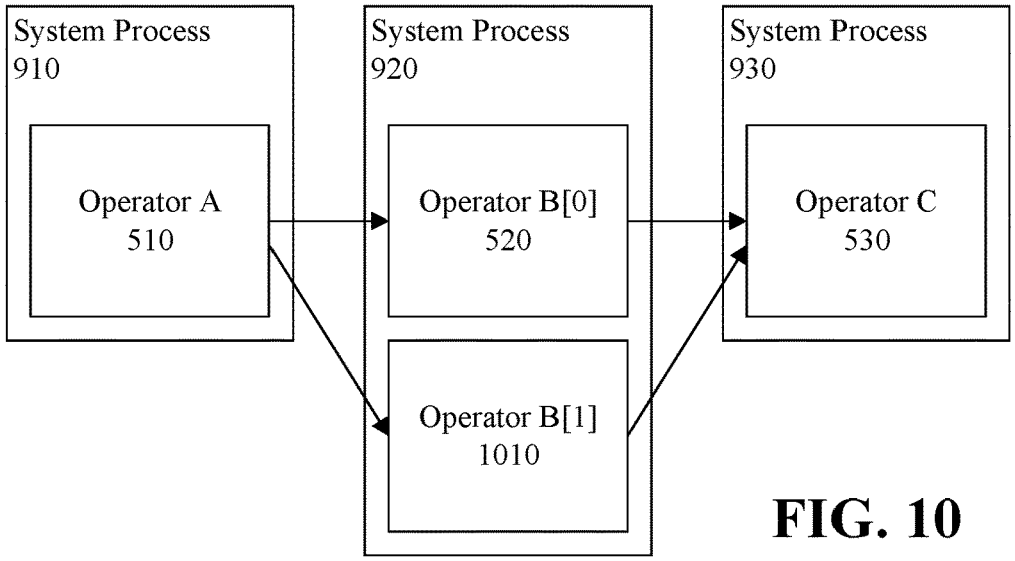
FIG. 10 depicts an example of a streams graph in which an operator is parallelized in a system process.

FIG. 10 depicts an example of a streams graph 1000 in which an operator is parallelized in a system process during processing and compiling of the streaming application 410 that defines the streams graph 500 to generate the compiled computer program code 430. In this example, it is assumed that operator B at node 520 is idempotent, and thus is parallelizable. Continuing with the example of FIG. 9, responsive to creating one or more additional instances of operator B, either initially when analyzing the streaming application or dynamically when executing the streaming application, the streams service 86 can add one or more instances of operator B, for example operator B[1] represented by node 1010, to the same system process 920 to which the an initial instance of the operator, operator B[0], is assigned. The example depicted in FIG. 10 can be implemented if the system process 920 has resources (e.g., one or more processing threads) available to execute operator B[0]. In such an arrangement, no additional system resources need be allocated for the streaming application since the system process 920 already is allocated to the streaming application.

Figure 11:
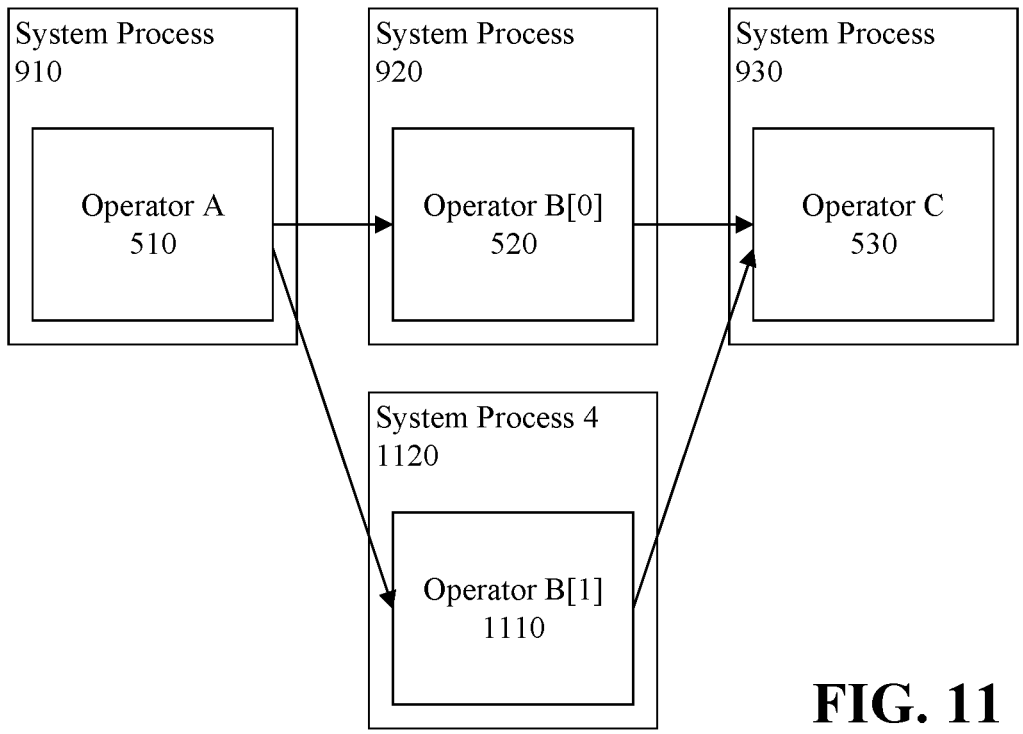
FIG. 11 depicts an example of a streams graph in which an operator is parallelized in a plurality of system processes.

FIG. 11 depicts an example of a streams graph 1100 in which an operator is parallelized in a plurality of system processes during processing and compiling of the streaming application 410 that defines the streams graph 500 to generate the compiled computer program code 430. In this example, it is assumed that operator B at node 520 is idempotent, and thus is parallelizable. Continuing with the example of FIG. 9, responsive to creating one or more additional instances of operator B, either initially when analyzing the streaming application or dynamically when executing the streaming application, the streams service 86 can add one or more instances of operator B, for example operator B[1] represented by node 1110, to one or more system processes that are different than the system process 920 to which the an initial instance of the operator, operator B[0], is assigned. For example, operator B[1] can be assigned to a system process 1120. The example depicted in FIG. 11 can be implemented if additional system resources are required, or anticipated to be required, to host operator B[1] and meet an applicable SLA.

Figure 12:
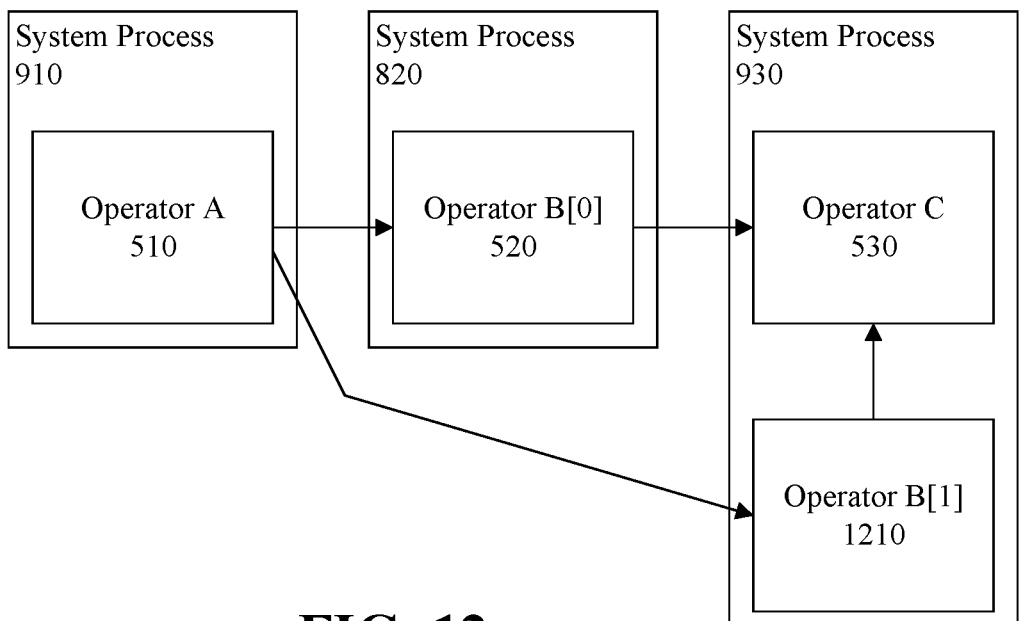
FIG. 12 depicts another example of a streams graph in which an operator is parallelized in a plurality of system processes.

FIG. 12 depicts another example of a streams graph 1200 in which an operator is parallelized in a plurality of system processes during processing and compiling of the streaming application 410 that defines the streams graph 500 to generate the compiled computer program code 430. In this example, it is assumed that operator B at node 520 is idempotent, and thus is parallelizable. Continuing with the example of FIG. 9, responsive to creating one or more additional instances of operator B, either initially when analyzing the streaming application or dynamically when executing the streaming application, the streams service 86 can add one or more instances of operator B, for example operator B[1] represented by node 1210, to one or more existing system processes that are different than the system process 920 to which the an initial instance of the operator, operator B[0], is assigned. For example, operator B[1] can be assigned to the system process 930 to which operator C represented by node 530 is assigned. The example depicted in FIG. 12 can be implemented if resources of the system process 820 are being used at or near full capacity executing one or more instances of the operator B, prior to the determination to initiate operator B[1], but the system process 930 has additional resource capacity available to execute the instance operator B[1].

Notably, the streams service 86 can use any of the operator allocation schemes described in FIGS. 9-12. In illustration, the streams service 86 can, prior to initiating a new instance of an operator, analyze resource usage in the various system processes allocated to the streaming application, and determine whether any of the system processes have resource capacity available to host the new instance of the operator. If the system process hosting other instances of the same operator has resource capacity available, the streams service 86 can assign the new instance of the operator to that system process. If that system process does not have resource capacity available, but another system process assigned to the streaming application does, the streams service 86 can assign the new instance of the operator to that other system process. If none of the system processes allocated to the streaming application, which are suitable for hosting the new instance of the operator, have resource capacity available, the streams service 86 can dynamically allocate a new system process to the streaming application, and assign the new instance of the operator to that new system process. If and when the workload on the streaming application decreases to a point where the new instance of the operator no longer is required, the streams service 86 can terminate the new instance of the operator and deallocate the new system process from the streaming application.

Figure 13:
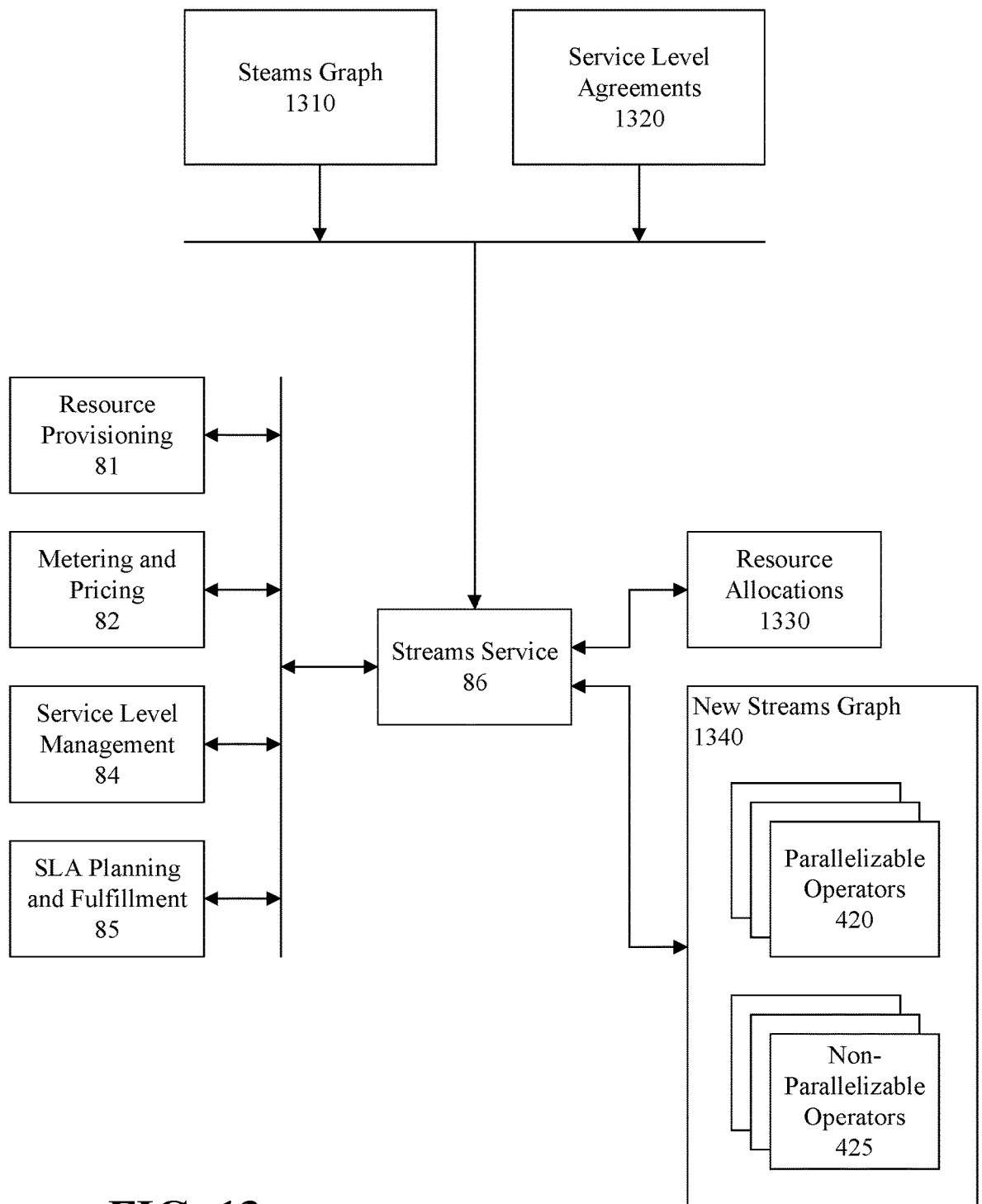
FIG. 13 depicts a further example implementation of a streams service.

FIG. 13 depicts a further example implementation of a streams service 86. The streams service 86 can receive the streaming application for compilation and deployment. For example, the streams service 86 can receive a streams graph 1310 for the streaming application, and perform the processes described with reference to FIG. 4 to identify parallelizable operators 420 and non-parallelizable operators 425. Prior to, or during, compiling the streaming application, the streams service 86 can interface with the resource provisioning 81 and/or SLA planning and fulfillment 85 (FIG. 2) to determine resource allocations 1330 for systems (e.g. systems of the hardware and software layer 60 and of the virtualization layer 70 of FIG. 2) the streams service 86 anticipates will be needed to host the streaming application while meeting one or more service level agreements 1320 in place for the streaming application. Further, the streams service 186 can negotiate with resource provisioning 81 to acquire the determined system resources, without acquiring system resources that may not be necessary, at least for initial deployment of the streaming application. In this regard, the service level agreement(s) 1320 can specify a volume of workload traffic (e.g., tuple flow rates), a level of maximum burst activity the system must handle, acceptable latencies, acceptable levels of dropped traffic, etc.

The resource provisioning 81 can maintain one or more functional data structures (e.g., database tables) via which resource provisioning 81 maintains and tracks data indicating presently allocated system resources and system resources that presently are unallocated. In addition, the data also can indicate capacity and performance capabilities of the various system resources. The resource provisioning 81 can share the data with the streams service 86, which the streams service 86 can process to determine system resource allocations for the streaming application.

During compile, the streams service 86 can compose system processes. Each system process can include one or more parallelizable operators 420 and/or one or more the non-parallelizable operators 425 of the streaming application, and can be configured to be deployed to a set of one or more respective system resources. The streams service 86 can determine resource allocations 1330 required to host such system processes, and allocate the operators 420, 425 to the system processes based on how the operators 420, 425 will be best divided over the available system resources, for example as described with reference to FIGS. 8-12. Responsive to determining the resource allocations 1330, the streams service 86 can interface with the resource provisioning 81 to allocate the system resources to the streaming application. In response, the resource provisioning 81 can update the previously described resource allocation data to indicate the system resources are allocated to the streaming application. In one non-limiting arrangement, when composing the system processes, the streams service 86 can isolate parallelizable operators from non-parallelizable operators, which can facilitate rapid addition, or removal, of instances of the parallelizable operators in the streaming application when executing.

During compile, the streams service 86 can generate a new streams graph 1340 for the streaming application. The new streams graph 1340 can include the parallelizable operators 420 and the non-parallelizable operators 425. Further, the new streams graph 1340 can indicate which operators are parallelizable operators 420 and which operators are non-parallelizable operators 425, and can indicate various system processes to which the various operators 420, 425 are assigned. In the case that the streams service 86 chooses to initiate a plurality of instances of any of the parallelizable operators 420, the new streams graph 1340 can include the plurality of instances.

Responsive to compiling the streaming application, the streams service 86 can deploy the compiled computer program code to the allocated system resources. Responsive to the system processes being deployed to their respective system resources, the streams service 86 can initialize the operators 420, 425 to execute, thus causing the streaming application to go live on the system resources to which the system processes are allocated.

While the operators 420, 425 of the streaming application execute, the metering and pricing 82 can monitor resource usage by the streaming application processing workloads by performing a resource usage assessment, and communicate an indication of such resource usage to the service level management 84. The indication can include performance metrics indicating a performance of the streaming application at processing the workloads. The service level management 84 can evaluate the performance metrics and, based on such evaluation, determine whether hosting of the streaming application is, or is near to, violating the applicable service level agreement(s) 1320 for the streaming application. In illustration, the service level management 84 can determine whether values of one or more of the performance metrics are, or are near to, exceeding a corresponding maximum performance criteria value specified by the applicable service level agreement(s) 1320, or determine whether values of one or more of the performance metrics are, or are near to, falling below a corresponding minimum performance criteria specified by the applicable service level agreement(s) 1320. If so, the service level management 84 can interface with the streams service 86 to notify the streams service 86 of such circumstance. Based on such circumstance, the service level management 84 can determine whether to initialize one or more instances of one or more parallelizable operators 420 to keep up with the workload demand without violating the applicable service level agreement(s) 1320.

In illustration, the service level management 84 can determine whether one or more parallelizable operators 420 (e.g. instances of the parallelizable operators 420) are at, or near, full workload capacity and a workload capacity criteria defined by the service level agreement(s) 1320 is greater than the present workload capacity of the presently initialized operator instances. In this regard, the rate of tuple flow can correspond to the workload since the operator 420 (or instance of the operator 420) performs operations on tuples received by the operator 420 (or instance of the operator 420) and generates tuples resulting from such operations. Whether an operator 420 (or instance of the operator 420) is at, or near, full workload capacity can be determined by a rate of tuple flow to and/or from the operator 420 (or instance of the operator 420), a latency of the tuple flow through the operator 420 and/or a number of workloads being dropped due to the operator 420 (e.g., a timeout occurs while tuples are waiting to be operated upon by the operator 420). For example, the service level management 84 can determine whether one or more tuple flows are at, near or below a threshold value specified as performance criteria by the service level agreement(s) 130, determine whether one or more latencies are at, near, or above a threshold value specified as a performance criteria by the service level agreement(s) 1320, determine whether a number of workloads being dropped is at, near, or above a threshold value specified as a performance criteria by the service level agreement(s) 1320 as a criteria, etc.

If any of these conditions are true, the service level management 84 can notify the streams service 86 of such conditions. In response, the streams service 86 can initiate one or more additional instances of one or parallelizable operators 420 to reduce workload on the subject operators 420. For example, the streams service 86 can, for one or more of the parallelizable operators 420, interface with resource provisioning 81 to dynamically, in real time, initiate execution of one or more instances of the parallelizable operator(s) 420, and direct a portion of the workload to those operators. In another aspect, the service level management 84 can interface directly with the resource provisioning 81 to initiate execution of one or more instances of the parallelizable operator(s) 420. The additional operator instance(s) can be assigned to existing system processes and/or new system processes, for example as described with reference to FIGS. 8-12. In one non-limiting arrangement, one or more operators, or operator instances, may be moved dynamically, in real time, by the resource provisioning 81 from current processing resources to which they are assigned to other processing resources in order to level workloads across the processing resources being utilized. Such movement can be determined by the resource provisioning 81 or at the behest of the stream service 86.

In one aspect of the present arrangements, the service level management 84 can interface with SLA planning and fulfillment 85 to determine a level of processing resources specified by the service level agreements 1320. For example, the customer for whom the streaming application is hosted may be paying for a certain level of system resources (e.g., number of processing resources, performance level of the processing resources, and so on). Thus, when assigning new system processes for additional instances of the parallelizable operator(s) 420, the service level management 84 can ensure that the addition of system resources to host new system processes does not exceed the level specified by the service level agreements 1320. If a maximum level of system resources is reached, additional instances of operators 420 being initialized can be assigned to existing system processes, for example as described with reference to FIGS. 10 and 12, and/or existing instances of operators 420 can be combined into existing system processes, for example as shown in FIG. 8

In a further arrangement, based on workload changes occurring over time in the streaming application, the streams service 86 can predict future workload requirements. For example, the service level management 84 can evaluate the resource usage by performing a resource usage assessment based on such evaluation, determine whether processing of one or workloads, if the workload(s) continue(s) increasing at or near its/their present rate, will violate one or more service level agreements 1320 within a threshold period of time. If so, the service level management 84 can notify the streams service 86 of such condition. In response, the streams service 86 can initiate one or more additional instances of one or parallelizable operators 420 in order to reduce workload on the subject operators 420, for example as previously described. Accordingly, violations of the service level agreement(s) 1320 can be prevented without such violations occurring.

The system can use the additional operator instances to improve workload performance. In illustration, the resource provisioning 81 can include a splitter which dynamically, in real time, allocates various workloads to different operators and/or operator instances. The splitter can choose routing based on any of several different strategies. In illustration, the splitter can implement a round robin scheme in which a first workload is routed to a first instance of an operator, a second workload is routed to a second instance of an operator, and so on. For example, workloads generated by IP addresses in a first geographic region can be routed to a first operator instance assigned to a first processing resource, and workloads generated by IP addresses in a second geographic region can be routed to a second operator instance assigned to a second processing resource. The operator instances can be selected based on the processing resource capacity. For example, if the level of workloads generated by the first geographic region is significantly larger than the level of workloads generated by the second geographic region, the first operator instance can be an operator instance assigned to system resources that are greater than the system resources assigned to the second operator instance. The splitter also can allocate workloads in other manners. For instance, the splitter can perform a hash on various workloads, and send the workloads to operator instances based on the resulting hash value. For example, if there are two operator instances, even hashes can be routed to a first operator instance and odd hashes can be routed to a second operator instance.

Just as the number of operator instances can be increased dynamically, the number of operator instances can be decreased dynamically, in real time, as workload volume of the streaming application decreases. For example, based on resource usage by workloads processed by the streaming application communicated by the metering and pricing 82 to the streams service 86, the streams service 86 can determine whether one or more instances of parallelizable operators 420 are underutilized (e.g., utilized less than a threshold level of utilization), and for which execution may be terminated while still ensuring that applicable service level agreements are met. For example, the streams service 86 can determine whether at least one performance metric for the streaming application indicates one or more instances of parallelizable operators 420 are underutilized (e.g., the rate of tuples streaming to the instances of parallelizable operators 420 falls below threshold values). If so, the streams service 86 can interface with resource provisioning 81 and indicate to the resource provisioning 81 to deallocate at least one instance of an operator 420 and direct workloads (e.g. tuples) presently directed to that/those instance(s) to one or more other instances of the operator 420, and terminate execution of the instance(s) of the operator 420 being deallocated. In addition, the resource provisioning 81 can deallocate processing resources hosting the instance(s) of the operator 420 being deallocated, thus freeing those processing resources to be used for other purposes.

In accordance with the described arrangements, processing resources can be allocated to a streaming application, and deallocated from the streaming application, dynamically and in real time. A system may host a plurality of streaming applications, and the different streaming applications may encounter peak workloads at different times. The ability to dynamically allocate and deallocate processing resources provides the ability of the system to maintain respective levels of service specified by the respective service level agreements with fewer resources in comparison to statically assigning the resources.

FIG. 14 is a flow chart illustrating an example of a method 1400 of performing resource allocation for a streaming application. At step 1402, the stream service 86 can monitor system resource usage by a streaming application processing workloads and, based on the monitoring, determining at least one performance metric for the streaming application in processing the workloads. At step 1404, the stream service 86 can determine, based on the at least one performance metric, whether hosting of the streaming application is, or is near to, violating at least one criteria specified by a service level agreement for the streaming application. At step 1406, the stream service 86 can, responsive to determining that hosting of the streaming application is, or is near to, violating the at least one criteria specified by the service level agreement, initialize, using a processor, at least one additional instance of at least one parallelizable operator of the streaming application that is currently executing. At step 1408, the stream service 86 can, responsive to initializing the at least one additional instance of at least one of the parallelizable operators, direct a portion of the workloads to the at least one additional instance of at least one of the parallelizable operators.

Figure 15:
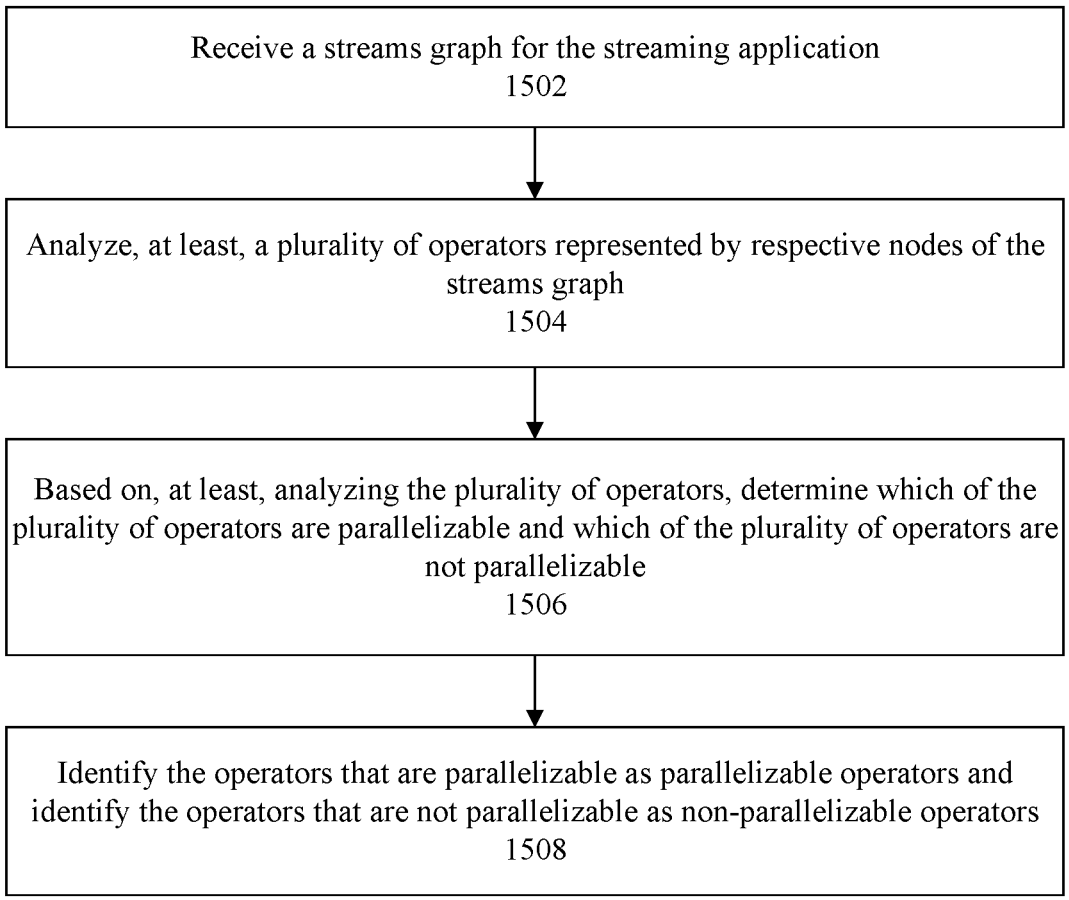
FIG. 15 is a flow chart illustrating an example of a method of identifying parallelizable and non-parallelizable operators in a streaming application.

FIG. 15 is a flow chart illustrating an example of a method 1500 of identifying parallelizable and non-parallelizable operators in a streaming application. At step 1502, the stream service 86 can receive a streams graph for the streaming application. At step 1504, the stream service 86 can analyze, at least, a plurality of operators represented by respective nodes of the streams graph. At step 1506, the stream service 86 can, based on, at least, analyzing the plurality of operators, determine which of the plurality of operators are parallelizable and which of the plurality of operators are not parallelizable. At step 1508, the stream service 86 can identify the operators that are parallelizable as parallelizable operators and identify the operators that are not parallelizable as non-parallelizable operators.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   monitoring system resource usage by a streaming application processing workloads, the streaming application comprising at least one parallelizable operator, at least a first instance of the parallelizable operator being initialized to execute;
   based on the monitoring the system resource usage by the streaming application processing the workloads, determining at least one performance metric for the streaming application in processing the workloads;
   determining, based on the at least one performance metric, whether hosting of the streaming application is, or is near to, violating at least one criteria;
   responsive to determining that hosting of the streaming application is, or is near to, violating the at least one criteria specified by the service level agreement, initializing, using a processor, at least one additional instance of the at least one parallelizable operator of the streaming application; and
   responsive to initializing the at least one additional instance of at least one of the parallelizable operators, directing a portion of the workloads to the at least one additional instance of at least one of the parallelizable operators.

2. The method of claim 1, wherein the at least one performance metric is a parameter selected from a group consisting of a tuple flow rate, a latency and a percentage of dropped workloads.

3. The method of claim 1, further comprising:
   determining, based on the at least one performance metric, whether at least one instance of the parallelizable operator is underutilized; and
   responsive to determining that the at least one instance of the parallelizable operator is underutilized, terminating execution of the at least one instance of the parallelizable operator and directing workloads presently directed to the at least one instance of the parallelizable operator to at least one other instance of the parallelizable operator.

4. The method of claim 1, further comprising:
   receiving a first streams graph for the streaming application;
   analyzing, at least, a plurality of operators represented by respective nodes of the first streams graph;
   based on, at least, analyzing the plurality of operators, determining which of the plurality of operators are parallelizable and which of the plurality of operators are not parallelizable; and
   identifying the operators that are parallelizable as parallelizable operators and identifying the operators that are not parallelizable as non-parallelizable operators.

5. The method of claim 4, further comprising:
   generating a second streams graph for the streaming application, wherein the second streams graph indicates the parallelizable operators, indicates the non-parallelizable operators, and indicates system processes to which the parallelizable operators and the non-parallelizable operators are assigned; and
   deploying the streaming application to processing resources, wherein deploying the streaming application comprises initializing the parallelizable operators and the non-parallelizable operators on the system processes to which they are assigned in the second streams graph.

6. The method of claim 4, further comprising:
generating a second streams graph for the streaming application, wherein the second streams graph comprises at least two instances of at least one of the parallelizable operators; and
deploying the streaming application to processing resources, wherein deploying the streaming application comprises initializing the at least two instances of at least one of the parallelizable operators.

7. The method of claim 1, further comprising:
responsive to determining that hosting of the streaming application is, or is near to, violating the at least one criteria specified by the service level agreement, moving at least one operator from a first system process to a second system process;
wherein the at least one additional instance of at least one parallelizable operator is initialized on the first system process.

8. A system, comprising:
a processor programmed to initiate executable operations comprising:
monitoring system resource usage by a streaming application processing workloads, the streaming application comprising at least one parallelizable operator, at least a first instance of the parallelizable operator being initialized to execute;
based on the monitoring the system resource usage by the streaming application processing the workloads, determining at least one performance metric for the streaming application in processing the workloads;
determining, based on the at least one performance metric, whether hosting of the streaming application is, or is near to, violating at least one criteria;
responsive to determining that hosting of the streaming application is, or is near to, violating the at least one criteria specified by the service level agreement, initializing at least one additional instance of the at least one parallelizable operator of the streaming application; and
responsive to initializing the at least one additional instance of at least one of the parallelizable operators, directing a portion of the workloads to the at least one additional instance of at least one of the parallelizable operators.

9. The system of claim 8, wherein the at least one performance metric is a parameter selected from a group consisting of a tuple flow rate, a latency and a percentage of dropped workloads.

10. The system of claim 8, the executable operations further comprising:
determining, based on the at least one performance metric, whether at least one instance of the parallelizable operator is underutilized; and
responsive to determining that the at least one instance of the parallelizable operator is underutilized, terminating execution of the at least one instance of the parallelizable operator and directing workloads presently directed to the at least one instance of the parallelizable operator to at least one other instance of the parallelizable operator.

11. The system of claim 8, the executable operations further comprising:
receiving a first streams graph for the streaming application;
analyzing, at least, a plurality of operators represented by respective nodes of the first streams graph;
based on, at least, analyzing the plurality of operators, determining which of the plurality of operators are parallelizable and which of the plurality of operators are not parallelizable; and
identifying the operators that are parallelizable as parallelizable operators and identifying the operators that are not parallelizable as non-parallelizable operators.

12. The system of claim 11, the executable operations further comprising:
generating a second streams graph for the streaming application, wherein the second streams graph indicates the parallelizable operators, indicates the non-parallelizable operators, and indicates system processes to which the parallelizable operators and the non-parallelizable operators are assigned; and
deploying the streaming application to processing resources, wherein deploying the streaming application comprises initializing the parallelizable operators and the non-parallelizable operators on the system processes to which they are assigned in the second streams graph.

13. The system of claim 11, the executable operations further comprising:
generating a second streams graph for the streaming application, wherein the second streams graph comprises at least two instances of at least one of the parallelizable operators; and
deploying the streaming application to processing resources, wherein deploying the streaming application comprises initializing the at least two instances of at least one of the parallelizable operators.

14. The system of claim 8, the executable operations further comprising:
responsive to determining that hosting of the streaming application is, or is near to, violating the at least one criteria specified by the service level agreement, moving at least one operator from a first system process to a second system process;
wherein the at least one additional instance of at least one parallelizable operator is initialized on the first system process.

15. A computer program product comprising:
a computer readable storage medium having program code stored thereon, the program code executable by a data processing system to initiate operations including:
monitoring system resource usage by a streaming application processing workloads, the streaming application comprising at least one parallelizable operator, at least a first instance of the parallelizable operator being initialized to execute;
based on the monitoring the system resource usage by the streaming application processing the workloads, determining at least one performance metric for the streaming application in processing the workloads;
determining, based on the at least one performance metric, whether hosting of the streaming application is, or is near to, violating at least one criteria;
responsive to determining that hosting of the streaming application is, or is near to, violating the at least one criteria specified by the service level agreement, initializing at least one additional instance of the at least one parallelizable operator of the streaming application; and
responsive to initializing the at least one additional instance of at least one of the parallelizable operators, directing a portion of the workloads to the at least one additional instance of at least one of the parallelizable operators.

16. The computer program product of claim 15, wherein the at least one performance metric is a parameter selected from a group consisting of a tuple flow rate, a latency and a percentage of dropped workloads.

17. The computer program product of claim 15, wherein the program code is executable by the data processing system to initiate operations further comprising:
   determining, based on the at least one performance metric, whether at least one instance of the parallelizable operator is underutilized; and
   responsive to determining that the at least one instance of the parallelizable operator is underutilized, terminating execution of the at least one instance of the parallelizable operator and directing workloads presently directed to the at least one instance of the parallelizable operator to at least one other instance of the parallelizable operator.

18. The computer program product of claim 15, wherein the program code is executable by the data processing system to initiate operations further comprising:
   receiving a first streams graph for the streaming application;
   analyzing, at least, a plurality of operators represented by respective nodes of the first streams graph;
   based on, at least, analyzing the plurality of operators, determining which of the plurality of operators are parallelizable and which of the plurality of operators are not parallelizable; and
   identifying the operators that are parallelizable as parallelizable operators and identifying the operators that are not parallelizable as non-parallelizable operators.

19. The computer program product of claim 18, wherein the program code is executable by the data processing system to initiate operations further comprising:
   generating a second streams graph for the streaming application, wherein the second streams graph indicates the parallelizable operators, indicates the non-parallelizable operators, and indicates system processes to which the parallelizable operators and the non-parallelizable operators are assigned; and
   deploying the streaming application to processing resources, wherein deploying the streaming application comprises initializing the parallelizable operators and the non-parallelizable operators on the system processes to which they are assigned in the second streams graph.

20. The computer program product of claim 18, wherein the program code is executable by the data processing system to initiate operations further comprising:
   generating a second streams graph for the streaming application, wherein the second streams graph comprises at least two instances of at least one of the parallelizable operators; and
   deploying the streaming application to processing resources, wherein deploying the streaming application comprises initializing the at least two instances of at least one of the parallelizable operators.

* * * * *